J. W. COURTNEY & J. C. PORTER.
BROOM CORN SEEDER.
APPLICATION FILED MAR. 19, 1908. RENEWED SEPT. 30, 1909.
944,178.
Patented Dec. 21, 1909.
5 SHEETS—SHEET 4.
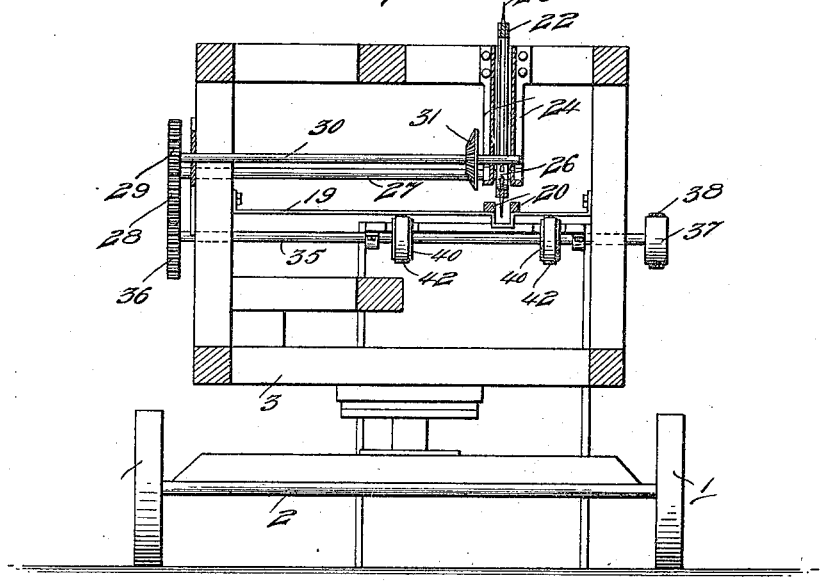
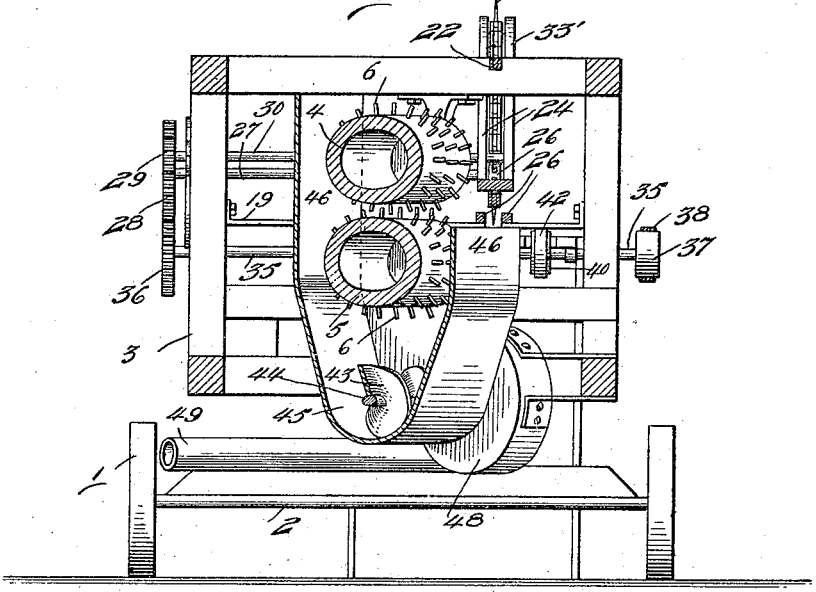
Witnesses
B. M. Offutt
Inventors
J. W. Courtney
John C. Porter
By H. B. Willson & Co.
Attorneys

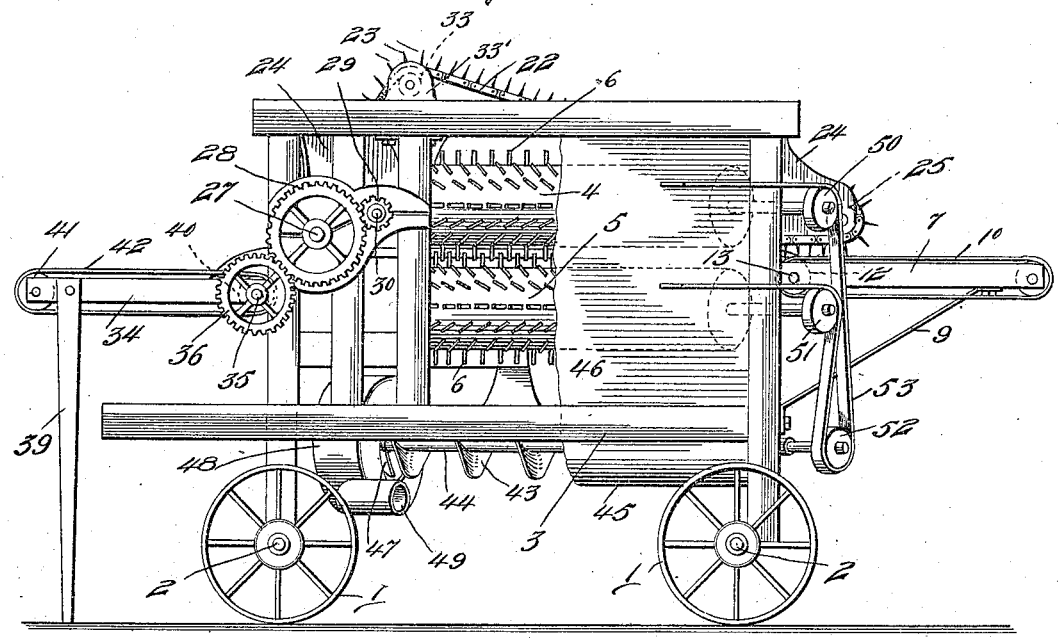

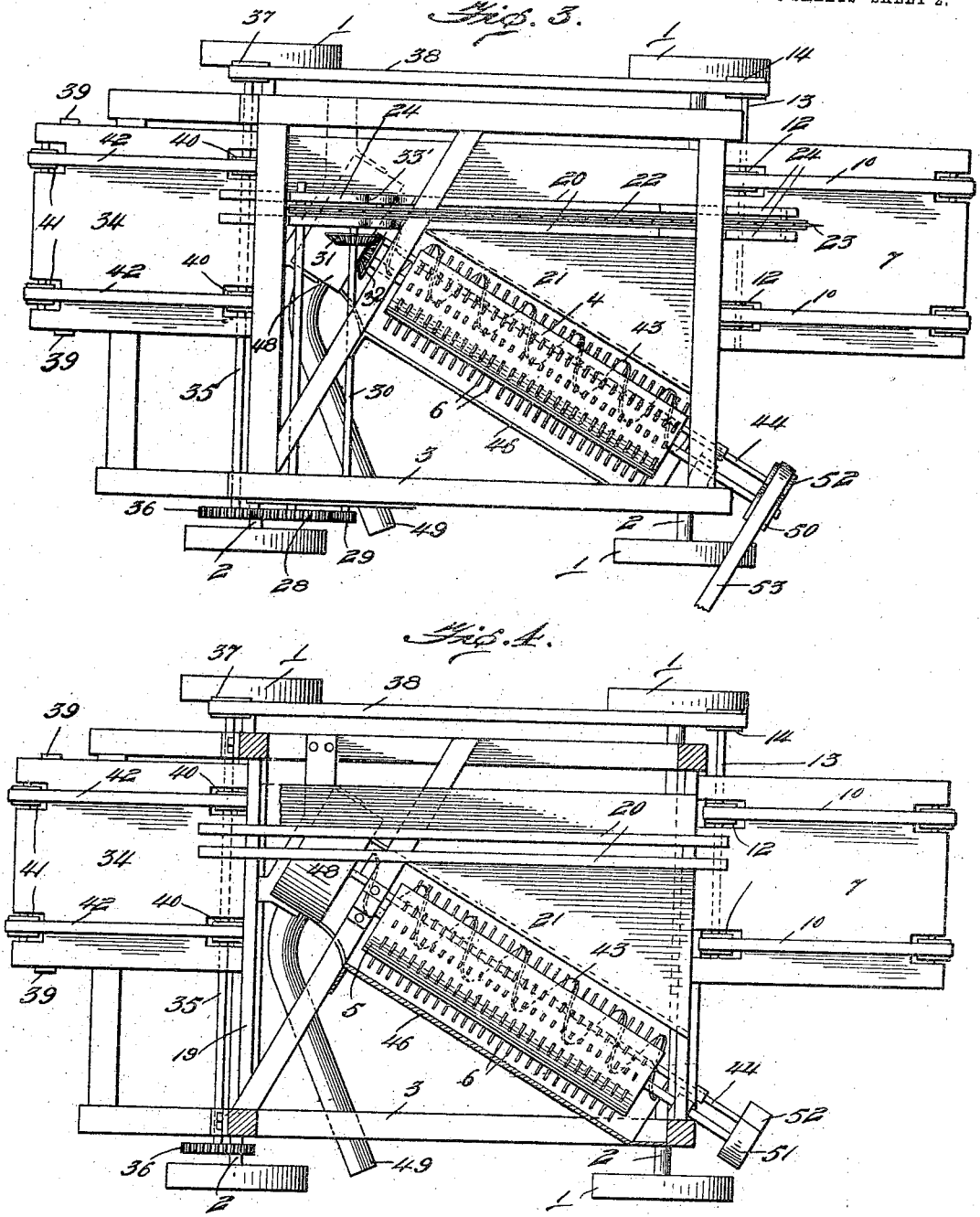

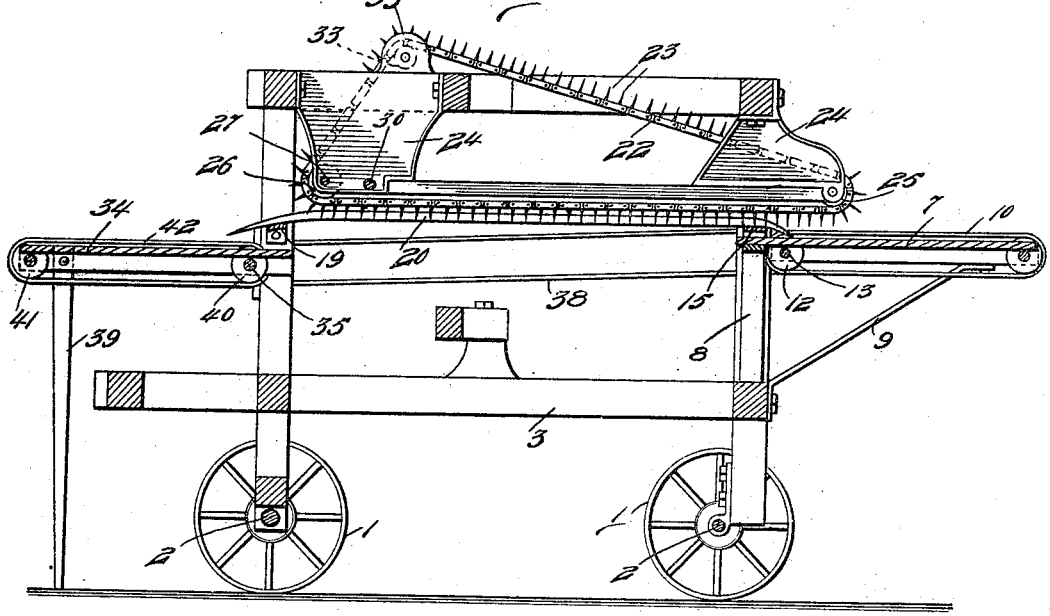

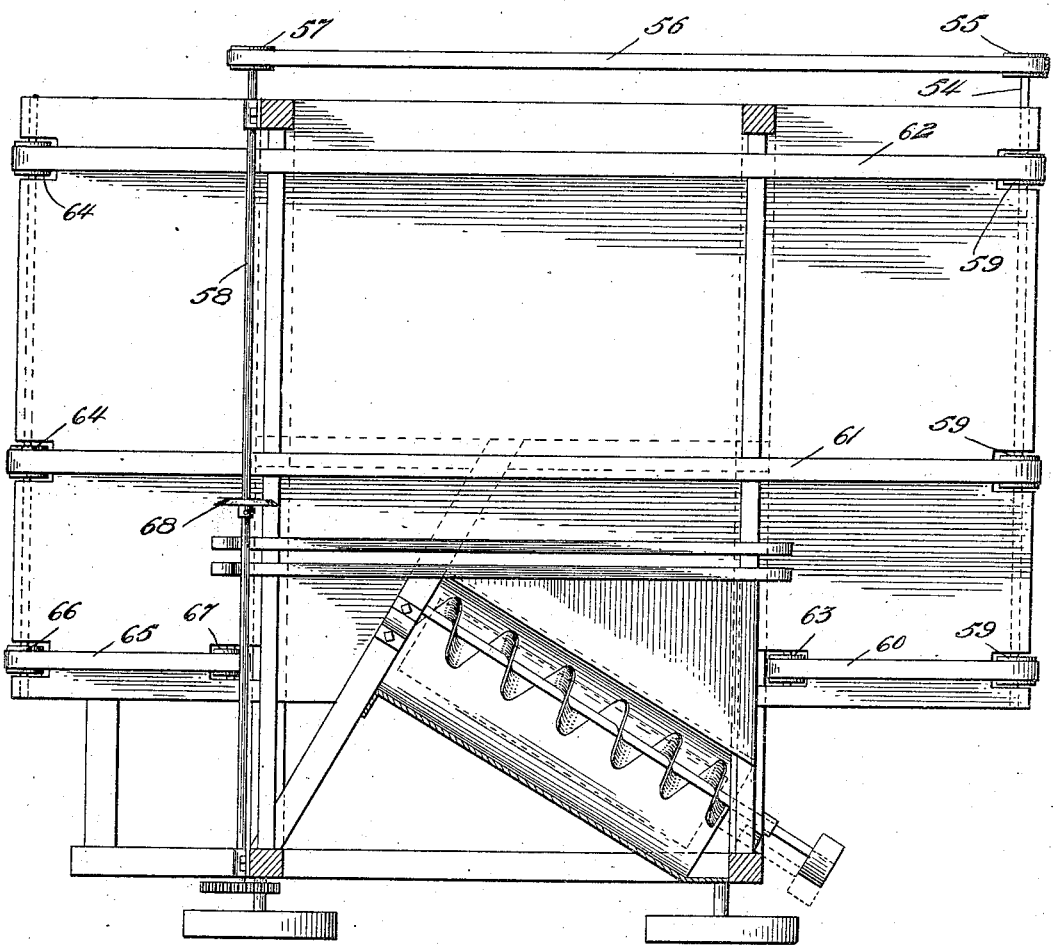

UNITED STATES PATENT OFFICE.

JOHN W. COURTNEY AND JOHN C. PORTER, OF RINGWOOD, OKLAHOMA.

BROOM-CORN SEEDER.

944,178.　　　　Specification of Letters Patent.　　Patented Dec. 21, 1909.

Application filed March 19, 1908, Serial No. 422,097. Renewed September 30, 1909. Serial No. 520,377.

*To all whom it may concern:*

Be it known that we, JOHN W. COURTNEY and JOHN C. PORTER, citizens of the United States, residing at Ringwood, in the county of Woods and State of Oklahoma, have invented certain new and useful Improvements in Broom-Corn Seeders; and we do declare the following to be a full, clear, and exact description of the invention, such as will enable others skilled in the art to which it appertains to make and use the same.

This invention relates to improvements in broom corn seeders.

The object of the invention is to provide a machine of this character by means of which the seed may be removed from the heads of broom corn, Kafir corn, cane and the like, without injury to the brush or stalks.

A further object is to provide a broom corn seeder which is comparatively simple in construction, efficient and reliable in operation, and having means whereby the stalks and heads are firmly held while the seeds are being threshed out.

With these and other objects in view, the invention consists of certain novel features of construction, combination and arrangement of parts as will be described and particularly pointed out in the appended claims.

In the accompanying drawings, Figure 1 is a side view of one side of the machine; Fig. 2 is a similar view of the opposite side; Fig. 3 is a top plan view; Fig. 4 is a horizontal sectional view taken above the feed table and lower threshing cylinder; Fig. 5 is a longitudinal vertical sectional view taken on a line with the feed chain of the machine; Fig. 6 is a front end view partly in section; Figs. 7 and 8 are vertical cross sectional views; and Fig. 9 is a view similar to Fig. 4, showing a slightly modified form of the machine.

Referring more particularly to the drawings, 1 denotes the supporting wheels, and 2, the axles of the machine. On the axles 2 is mounted a supporting frame, 3, having arranged therein adjacent to its diagonally opposite corners suitable bearings in which are revolubly mounted upper and lower threshing cylinders, 4 and 5, said cylinders being arranged obliquely to the length of the machine, and each of the same is provided with rows of radially projecting threshing teeth, 6, which are adapted to closely intermesh when the cylinders are revolved and to thereby remove the seed from the corn or cane passing between the same.

At the feed end of the machine is arranged a stationary feed table, 7, the inner end of which is supported upon a bail-shaped bracket, 8, secured to one of the cross-pieces of the supporting frame, 3. The outer end of the table, 7, is supported by inclined brace bars, 9. Adapted to travel around the table, 7, are endless feed belts, 10, said belts traveling around idle pulleys journaled in the outer end of the table and around driven pulleys, 12, which are mounted upon a drive shaft, 13, journaled in the inner end of the table, as shown. The shaft, 13, is provided on one end with a drive pulley, 14, to receive an operating belt hereinafter described.

Above the inner end of the table, 7, is a transversely disposed supporting bar, 15, the opposite ends of which are bent at right-angles and provided with slots adapted to receive fastening bolts, 16, which are passed therethrough and through the adjacent corner posts of the frame, 3, thereby adjustably holding the bar 15 in place. Connected to the center of the bar, 15, is an adjusting bar, 17, the lower end of which extends through an aperture in the lower cross bar of the supporting frame and is provided on each side of said bar with an adjusting nut, 18, by means of which said bolt and the bar 15 may be raised or lowered. Secured at one end to the bar, 15, and at their opposite ends to a similar bar, 19, at the opposite end of the machine, are parallel guide tracks, 20, which are spaced apart a suitable distance to receive the teeth of a feed chain hereinafter to be described. Also connected to the bar, 15, is a triangularly-shaped feed table, 21, the forward end of which is connected to the tracks 20.

By providing means for adjusting the tracks with respect to the feed chain, more or less space may be provided between these parts to facilitate the feeding of large or small heads of broom corn or to permit a larger amount of material to be fed between the same.

Arranged for travel in the upper portion of the machine above the tracks, 20, is a feed chain, 22, each link of which is provided with a series of teeth, 23, which, as the lower stretch of the chain passes along over the tracks, 20, are adapted to enter and pass between said tracks, the latter serving to hold the chain in alinement so that when the teeth are engaged with the corn or cane to be threshed, the heads will be held in position and prevented from being pulled between the threshing cylinders by the action of the teeth thereon. By providing open guide tracks for the feed chain, the latter and the teeth thereof are prevented from becoming worn as would be the case should the chain or teeth bear upon a solid surface while in action.

The chain 22 passes between guide plates, 24, arranged at the opposite ends of the frame, 3, and over sprocket wheels, 25 and 26, which are journaled in said plates, the wheel, 26, being fixedly mounted upon an operating shaft, 27, revolubly mounted at the delivery end of the machine, said shaft having mounted on one end a large drive gear, 28, with which is engaged a drive pinion 29 on a drive shaft, 30, the latter shaft having fixedly mounted on its opposite end a bevel gear 31, which is engaged with a bevel gear, 32, fixedly mounted on the adjacent end of the upper threshing cylinder shaft, whereby the motion of said cylinder is imparted through the shafts 30 and 27 to drive the feed chain. The upper stretch of the chain 22 is adapted to travel over an idle gear, 33, mounted in a bearing bracket 33', secured to and projecting above the frame as shown.

At the delivery end of the machine is arranged a delivery table 34, the inner end of which is hingedly connected to a drive shaft, 35, on one end of which is fixedly mounted a gear, 36, which engages and is driven by the large gear, 28, on the shaft, 27. On the opposite end of the shaft, 35, is mounted a belt pulley, 37, around which is adapted to pass a belt, 38, said belt also passing around the pulley, 14, on the shaft, 13, of the feed table, whereby said shaft is driven to operate the feed belts, 10, on said table. The outer end of the delivery table, 14, is supported in operative position upon hinged legs, 39. On the shaft, 35, are fixedly mounted belt pulleys, 40, around which, and around idle pulleys, 41, in the outer end of the table, are adapted to travel delivery belts, 42, said belts being driven by the shaft 35.

Below the lower threshing cylinder and extending in parallel relation thereto, is a spiral conveyer, 43, which is mounted on a shaft, 44, and is adapted to operate in a suitable trough, 45, formed by a continuation of a sheet metal casing, 46, which forms a partial inclosure for the threshing cylinders and serves to direct the threshed-out seed downwardly into said trough. On the end of the shaft 44 at the delivery end of the machine is mounted a fan, 47, around which is arranged a casing, 48, to which is connected a delivery spout, 49, through which the threshed-out seed, which is carried to the fan casing by the conveyer, is blown out of the machine.

On the ends of the upper and lower cylinder shafts at the feed end of the machine are fixedly mounted driving pulleys, 50 and 51, while on the adjacent end of the conveyer shaft, 44, is mounted a belt pulley, 52. Around the pulleys, 50, 51 and 52, is passed a main driving belt, 53, said belt being connected to any suitable source of power whereby the various parts of the machine are driven.

By hingedly connecting the inner end of the delivery table to the shaft, 35, said table may be swung upwardly against the end of the machine when the latter is not in operation.

The machine as hereinbefore described is constructed particularly for use in threshing the seed from broom corn, the tops of which are cut off in the field and brought to the machine in substantially the proper lengths for baling.

In Fig. 9 of the drawings is shown a slightly modified form of the machine adapted for threshing the seed from broom corn, Kafir corn, cane and the like, which is cut full length and bundled in the field by a harvester and binder. The threshing mechanism in this modified form of the machine is the same as that shown in the first form of the device, and the same form and arrangement of feed chain and guide tracks is employed, and a further description of these parts is not thought necessary.

In the modified form of the machine as shown in Fig. 9, the frame, 3, is made wider to accommodate the full length of the stalks, and a different arrangement of feed belts is employed. In this instance, the feed table is provided along its outer end with a drive shaft 54, having on one end a drive pulley, 55, around which passes an operating belt, 56, which corresponds to the belt, 38, of the first form of the device, and runs around a pulley, 57, on a drive shaft, 58 at the inner end of the delivery table and which corresponds to the shaft 35 in the other figures.

On the shaft 54 is mounted a series of pulleys 59 around which run belts, 60, 61 and 62. The belt 60 is located adjacent to one side of the feed table and runs over an idle pulley, 63, at the inner end of the table. The belts 61 and 62 extend across the feed table, through the machine and across the delivery table at the opposite end, where they pass around idle pulleys, 64. At the forward side of the delivery table is a belt, 65, which runs around a drive pulley 66 on the shaft 58 and around an idle pulley 67 mounted at the outer end of the table.

On the shaft, 58, adjacent to the inner sides of the guide tracks 20, is fixedly mounted a cutter disk or wheel 68, which is adapted to sever the threshed heads from the stalks without injuring either the heads or stalks. After being thus threshed and severed, the heads are ready for baling, while the stalks are used for fodder or other purposes.

Having thus particularly described our invention, what we claim as new and desire to secure by Letters-Patent, is:

1. In a machine of the character described, a supporting frame, threshing cylinders operatively mounted therein, a feed chain, a pair of guide tracks to co-act with said chain, a track supporting bar adjustably mounted on said frame, a threaded adjusting bar connected to said track supporting bar, and adjusting nuts on said adjusting bar whereby the latter is raised and lowered to adjust said tracks with respect to said chain, substantially as described.

2. In a broom corn seeder, a wheeled supporting frame, a pair of obliquely disposed threshing cylinders revolubly mounted in said frame, a casing arranged around said cylinders, a trough formed by a continuation of said casing below said cylinders, a spiral conveyer arranged in said trough, a discharge fan mounted on the end of said conveyer and adapted to discharge the seed caught by said trough and carried to the fan by said conveyer, a feed table at one end of said frame, a delivery table at the opposite end, belts operatively mounted on said tables, a pair of adjustably mounted guide tracks, a feed chain arranged to travel over said tracks, teeth formed on the links of said chain and adapted to pass between said tracks when the lower stretch of the chain passes over the same, a supporting bracket and guide pulley arranged on the upper portion of the frame to support the upper stretch of the chain, and means whereby the operative parts of the machine are driven, substantially as described.

3. In a machine of the character described, a supporting frame, threshing cylinders operatively mounted therein, a pair of guide tracks, a feed chain to coöperate with said tracks, means to adjust the latter with respect to said chain, and a revolving cutter to sever the heads from the stalks of the material, substantially as described.

In testimony whereof we have hereunto set our hands in presence of two subscribing witnesses.

JOHN W. COURTNEY.
JOHN C. PORTER.

Witnesses:
T. J. STALEY,
CLARICE DUVAL.